United States Patent [19]
Maeda et al.

[11] Patent Number: 5,332,282
[45] Date of Patent: Jul. 26, 1994

[54] SUN-ROOF HOUSING

[75] Inventors: Kenji Maeda, Kariya; Kenichiro Hayashi, Okazaki; Mitsuyoshi Masuda, Nagoya; Hirofumi Nishikawa, Okazaki; Kasuhiro Suzuki, Aichi, all of Japan

[73] Assignee: Aisin Seiki Kabushiki Kaisha, Kariya, Japan

[21] Appl. No.: 802,577

[22] Filed: Dec. 5, 1991

[30] Foreign Application Priority Data

Dec. 7, 1990 [JP] Japan .................. 2-400188[U]

[51] Int. Cl.⁵ .................................. B60J 7/00
[52] U.S. Cl. .............................. 296/213; 296/216; 296/223
[58] Field of Search ............... 296/213, 216, 223

[56] References Cited

U.S. PATENT DOCUMENTS

| | | | |
|---|---|---|---|
| 4,895,410 | 1/1990 | Grimm et al. | 296/214 |
| 5,022,705 | 6/1991 | Takahashi | 296/216 X |
| 5,100,197 | 3/1992 | Ichinose et al. | 296/213 X |

FOREIGN PATENT DOCUMENTS

| | | | |
|---|---|---|---|
| 3114393 | 11/1982 | Fed. Rep. of Germany | 296/213 |
| 0034815 | 2/1987 | Japan | 296/213 |

*Primary Examiner*—Dennis H. Pedder
*Attorney, Agent, or Firm*—Finnegan, Henderson, Farabow, Garrett & Dunner

[57] ABSTRACT

A sun-roof housing comprises a main body formed into a U-shaped configuration with two corners and having a first gutter portion therealong and pair of laterally spaced rail portions for guiding a roof member, a cut-out portion formed at each of the corner by which the first gutter portion is divided into discontinuous segments, and a cover having a second gutter portion defined by an inner side wall and an outer side wall and set to be fixed to each corner of the main body in such a manner that the second gutter portion is located in the cut-out portion so as to be in fluid communication with the separated segments and the inner side wall is in fluid tight engagement with each corner of the main body.

4 Claims, 3 Drawing Sheets

SUN-ROOF HOUSING

BACKGROUND OF THE INVENTION

1. Field of the Invention

The present invention relates to a sun-roof housing for use in an automotive vehicle.

2. Description of the Related Art

A conventional sun-roof housing related to the present invention is disclosed in U.S. Pat. No. 4,895,410. In the conventional sun-roof housing, a U-shaped main body along which a first gutter portion is formed has two corners each of which is cut out so as to be coupled with a second gutter portion with a drain port to be in fluid communication with the first gutter portion.

However, the connection of the second gutter portion to the main body is established in such a manner that an inner side periphery of the second gutter portion is directly adhered to an outer side of the cut-out portion by means of bonding agent. This results in that the bonding agent should be supplied between the second gutter portion and the cut-out portion which is of wide range. This supply is a cumbersome task to establish a perfect sealing between two portions. If a portion has been generated which is not supplied with the bonding agent, through the portion water passes, whereby unexpected accident may occur.

SUMMARY OF THE INVENTION

It is, therefore, a primary object of the present invention to provide a sun-roof housing without the foregoing drawbacks.

It is another object of the present invention to reduce the area to be sealed by sealing agent.

The above and other objects are achieved by a sun-roof housing according to the present invention which comprises a main body formed into a U-shaped configuration with two corners and having a first gutter portion therealong and a pair of laterally spaced rail portions for guiding a roof member, a cut-out portion formed at each of the corner by which the first gutter portion is divided into two uncontinous segments, and a cover having a second gutter portion defined by an inner side wall and an outer side wall and set to be fixed to each corner of the main body in such a manner that the second gutter portion is located in the cut-out portion so as to be in fluid communication with the separated segments and the inner side wall is in fluid tight engagement with each corner of the main body.

BRIEF DESCRIPTION OF THE DRAWINGS

Additional objects and advantage of the present invention will become more apparent from the following detailed description of preferred embodiment thereof when considered with reference to the attached drawings, in which.

DETAILED DESCRIPTION OF THE PREFERRED EMBODIMENT

Figure 1:
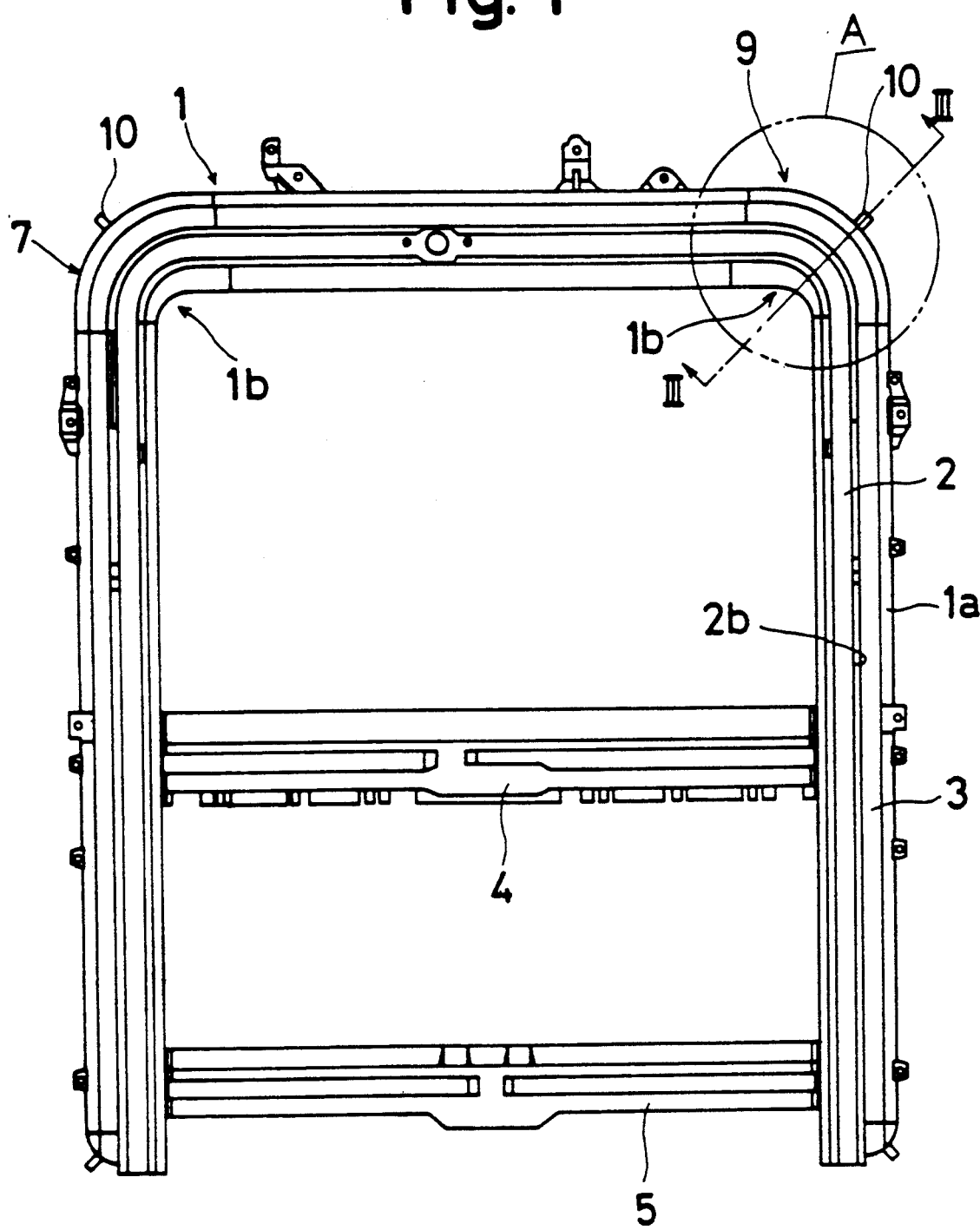
FIG. 1 is a plane view of a sun-roof housing according to the present invention.
Figure 2:
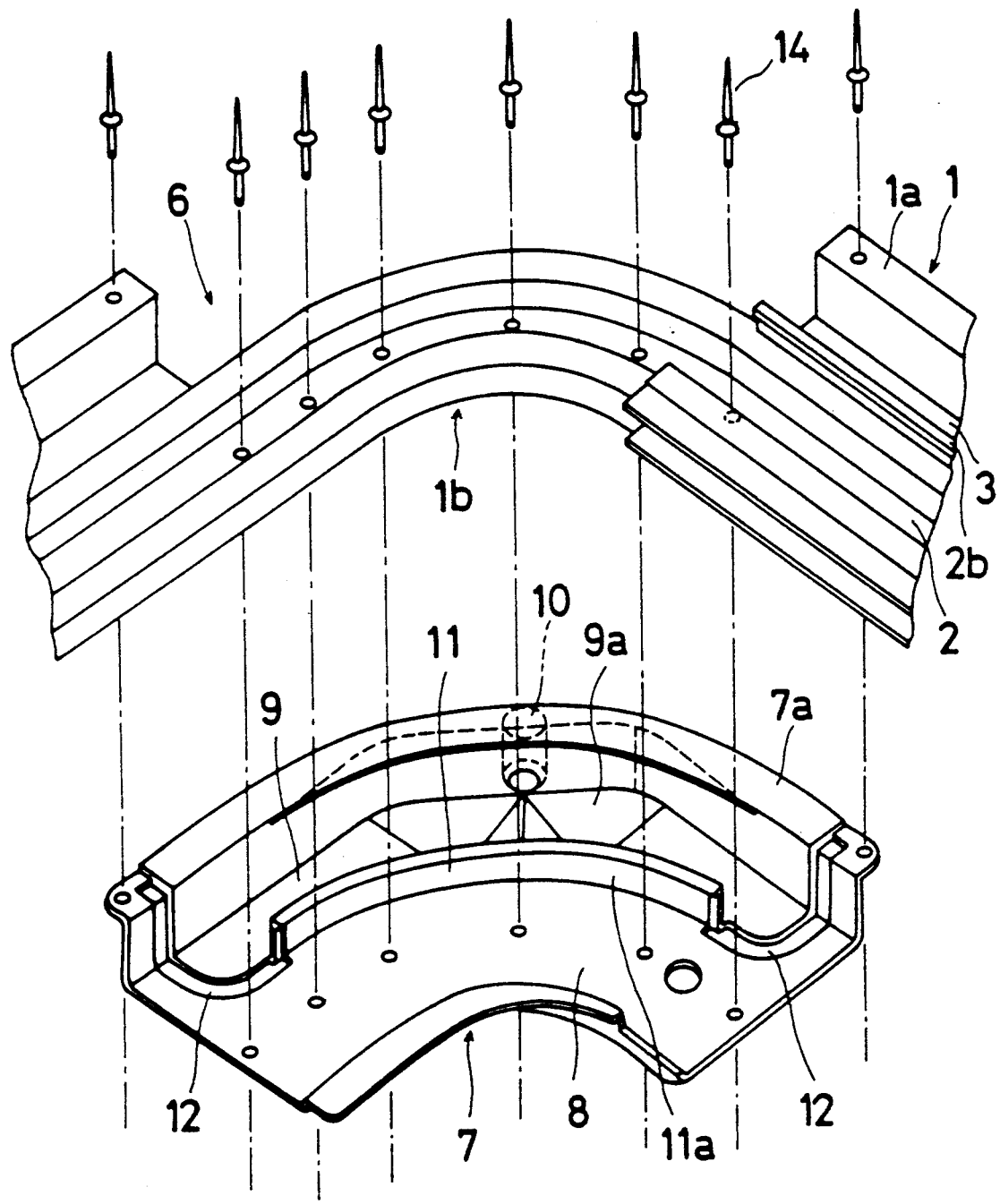
FIG. 2 is an enlarged exploded perspective view of a portion indicated by "A" in FIG. 1.

Referring to FIG. 1, a main body 1 of a sun-roof housing is formed into a U-shaped construction in plane by bending a length of an aluminum extruded member. The main body 1 includes a pair of laterally spaced rail portions 2 each of which has a pair of laterally opposed grooves 2a and 2a (FIG. 3) and a first gutter portion 3 which is defined by a side wall 2b and a side wall 1a of the main body 1. The rail portions 2 are used for guiding a roof member (not shown) therealong in the lengthwise direction of the vehicle. The first gutter portion 3 is formed integrally with the rail portion 2 except for its corners 1b or bent portions (FIG. 2). Members 4 and 5 are used for reinforcing the main body 1. The resulting housing is mounted on a vehicle roof (not shown) and an opening formed in the roof is opened/closed by a roof panel (not shown) which is in sliding engagement with the rail portion 2.

Figure 3:
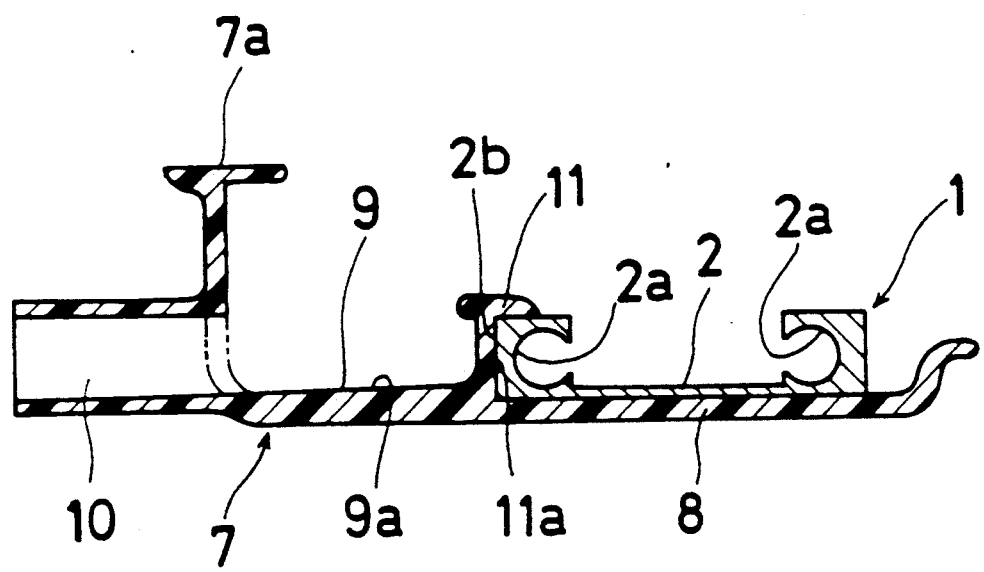
FIG. 3 is a cross-sectional view taken along line III—III in FIG. 1.

As shown in FIG. 2 and FIG. 3, a cut-out portion 6 is formed at the corners 1b of the main body 1 in such a manner that the cut-out portion 6 separates the first gutter portion 3 into two uncontinous segments.

A cover 7 includes a base portion 8 on which the rail portion 2 of the main body 1 is mounted and a second gutter portion 9 which is defined by the side wall 2b of the rail portion 2 and an outer side wall 7a of the cover 7. The second gutter portion 9 is formed integrally with the base portion 8. A drain port 10 is formed at a lower portion of the side wall 7a which is connected to the second gutter portion 2, and a bottom portion 9a is formed to incline toward the drain port 10. At a boundary portion between the base portion 8 and the second gutter portion 9, there is provided an upstanding wall 11 as a inner side wall with a height along the side wall 2b of the rail portion 2 so as to separate the base portion 8 from the second gutter 9. The second gutter portion 9 is defined by both side walls 7a and 11. At each of the remaining boundary portions at which the upstanding wall 11 does not exist, a groove 12 is formed into which an amount of sealing agent (not shown) is filled.

Thus constructed cover 7 is fixed to the corners 1b of the main body 1 by a plurality of pins 14. The rail portion 2 of the main body 1 is connected to the base portion 8 of the cover 7 in such a manner that the side wall 2b is set to be guided along an outer side 11a of the upstanding wall 11, thereby establishing the fluid communication between the first gutter portion 3 of the main body 1 and the second gutter portion 9 of the cover 7. Under this condition, the fluid tight relationship between the main portion 1 and the cover 7 is set to be established by the upstanding wall 11 and the sealing agent in each groove 12.

Thus, in comparison with the prior art, the present invention enables the reducing of an area to be sealed by sealing agent due to the provision of the upstanding wall 11. This will prevent the fluid leakage due to the deterioration of the sealing agent. Since the rail portion 2 of the main body 1 is guided along the outer side 11a of the upstanding wall 11, the positioning upon assembly of the housing becomes easier, by which the operation productivity can be improved.

Obviously, numerous modifications and variations of the present invention are possible in light of the above teaching. It is therefore to be understood that the scope of the appended claims, the invention may be practiced otherwise than as specifically described herein.

What is claimed is:

1. A sun-roof housing comprising:
   a main body of U-shaped configuration with two corners and having a first gutter portion and a pair of laterally spaced rail portions for guiding a roof member, said first gutter portion having laterally spaced, generally vertical inner and outer walls;

a cut-out portion at each of said corners and dividing said first gutter portion, including said generally vertical inner and outer walls, into separated segments; and a pair of covers, each having a second gutter portion defined by an inner side wall and an outer side wall and set to be fixed respectively to each corner of said main body so that said second gutter portion is located in each of said cut-out portions to be in fluid communication with said separated segments and so that said inner side wall is in fluid tight engagement with the inner one of said generally vertical inner and outer walls at each corner of said main body.

2. A sun-roof housing as set forth in claim 1, wherein said outer side wall of each of said covers is provided with a drain port having a diameter and wherein the height of said inner side wall of each of said covers is at least equal to the diameter of said drain port.

3. A sun-roof housing as set forth in claim 1, wherein each rail portion is adjacent to said inner side wall of each of said covers.

4. A sun-roof housing as set forth in claim 3, wherein each rail portion is in fluid-tight engagement with an upper flange portion of said inner side wall of each of said covers.

* * * * *